United States Patent

Matsukawa

[11] Patent Number: 5,848,313
[45] Date of Patent: Dec. 8, 1998

[54] CAMERA HAVING A DISPLAY DEVICE WITH A PROTECTOR

[75] Inventor: Nobuo Matsukawa, Tokyo, Japan

[73] Assignee: Nikon Corporation, Tokyo, Japan

[21] Appl. No.: 850,815

[22] Filed: May 2, 1997

Related U.S. Application Data

[63] Continuation of Ser. No. 456,007, May 30, 1995, abandoned, which is a continuation of Ser. No. 208,852, Mar. 11, 1994, abandoned.

[30] Foreign Application Priority Data

Mar. 15, 1993 [JP] Japan ............................... 5-017286 U

[51] Int. Cl.⁶ .................................................. G03B 17/02
[52] U.S. Cl. .............................................................. 396/535
[58] Field of Search ..................... 396/535, 439, 396/281, 297, 299; 354/288, 289.1, 289.11, 471

[56] References Cited

U.S. PATENT DOCUMENTS

| | | | |
|---|---|---|---|
| 4,483,601 | 11/1984 | Sekida et al. | 354/288 |
| 4,687,308 | 8/1987 | Someya | 354/289.1 X |
| 5,184,173 | 2/1993 | Kirigaya | 354/471 |
| 5,291,236 | 3/1994 | Ohsawa et al. | 354/412 |

*Primary Examiner*—Safet Metjahic
*Assistant Examiner*—J. K. Han

[57] ABSTRACT

A camera having a display device with a transparent window member at the top surface of the camera body. The camera body has a cover with an outer wall rising from the cover top surface, so that a direct impact on the window member is difficult, and the cracking of window member or its dislodgment from the cover, is difficult. The cover outer wall surrounds the periphery of the window member. In one embodiment, the cover outer wall is made up of a plurality of wall portions which do not surround the entire periphery of the window member and have cutout portions so that water drops and dust can be easily removed from the window member.

23 Claims, 5 Drawing Sheets

CAMERA HAVING A DISPLAY DEVICE WITH A PROTECTOR

This application is a continuation, of application Ser. No. 08/456,007, filed May 30, 1995, now abandoned, which is a continuation of Ser. No. 08/208,852, filed Mar. 11, 1994, now abandoned.

BACKGROUND OF THE INVENTION

1. Field of the Invention

The present invention relates to a camera having a display device which possesses a large-sized display member such as a liquid crystal panel and, in particular, to a camera having a display device with a protector which protects the window member covering the opening of the display part from shock, rain water, dust, etc.

2. Description of the Related Art

Figure 8:
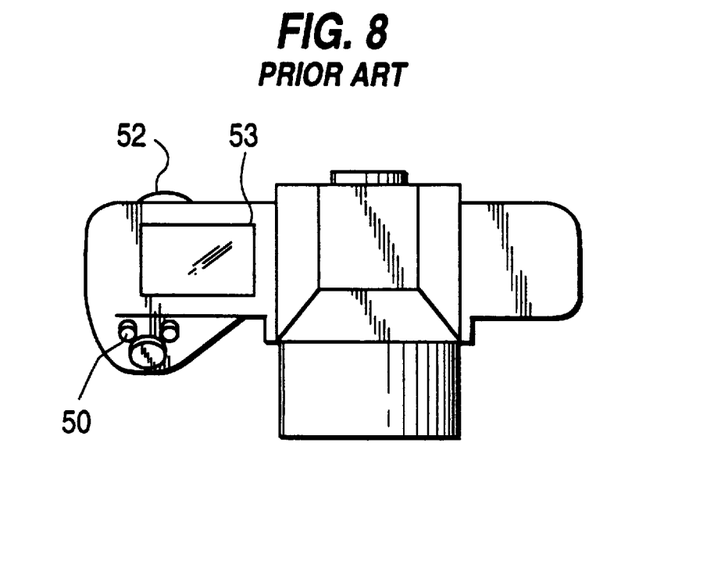
FIG. 8 is a top view which shows the configuration of a camera provided with a conventional display device.
Figure 9:
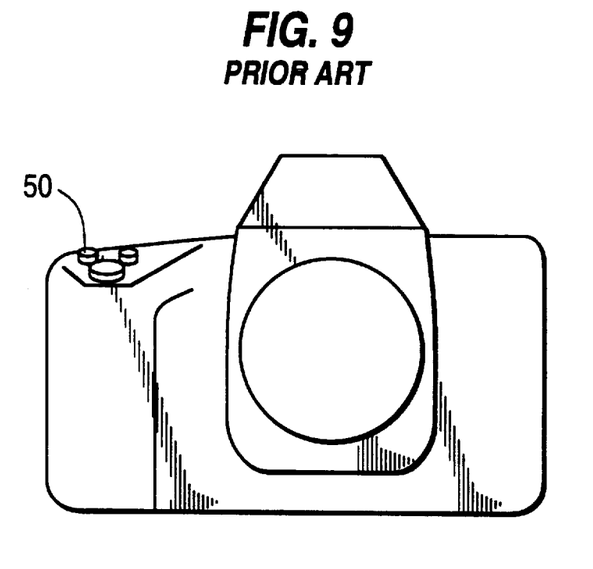
FIG. 9 is a frontal view of the camera of FIG. 8.

In recent years, cameras with information setting members, which control various settings for the camera, have been manufactured which do not use lever members or dial members such as shutter dials, but which instead use dial members of a rotary encoder format which generate pulses and conduct digital inputs. The configuration of a conventional example of this type of camera is shown in FIGS. 8 and 9. For example, the setting of the status of a certain camera function is performed by rotating a dial 52 while pushing a button 50. In this camera, the setting state and the camera control state are externally displayed on a display element 53 by a liquid crystal panel.

With regard to a camera with this type of information setting system, since a plurality of functions can be combined on one dial member, and since there is a large degree of freedom as to the place where the dial member may be arranged, it does not take up much space. In a camera such as this, due to an increase in the contents to be displayed and in order to make the display easier to see, the display member provided on the top surface of the camera cover has come to occupy a considerably large area. The camera cover has an opening through which the display element can be seen and a transparent acrylic resin window member occupies the opening, such that it covers the display element.

With a camera possessing this type of system, since the operational members of the dial are few and the display device can be made thin, there is the advantage that the top surface of the camera has a form which is free of irregularities and which offers a streamlined design. On the other hand, a major drawback of such a display device is that it is susceptible to numerous external impacts.

That is, since the display element adopts a design which affixes a transparent acrylic resin window member to the cover which is ordinarily provided at the opening of the cover, there is the problem that the display element having a large area with a cover free of irregularities is easily susceptible to an impact with an object, such as with another camera, and the window member is easily damaged.

SUMMARY OF THE INVENTION

Accordingly it is an object of the present invention to overcome the drawbacks of the conventional camera.

It is another object of the present invention to provide a camera having a display device which can prevent damage caused by an external impact to a display element having a large area.

Additional objects and advantages of the present invention will be set forth in part in the description which follows, and, in part, will be obvious from the description, or may be learned by practice of the invention.

The above objects are achieved by a camera having a display device provided with a display portion, facing the top surface of the camera, which displays information relating to photography, a cover which is provided with an opening corresponding to the display portion and has an outer wall of the display device, and a window member which covers the opening in such a way that it is possible to view the display portion to read the information settings. The cover outer wall is divided into a plurality of wall parts with spaces provided in between the wall parts. The wall parts are arranged near the periphery of the display portion and extend higher than the surface of the display portion to protect the display portion from an external impact. The wall parts may be integrally formed with the cover.

In addition, in a preferred embodiment of the present invention, the cover and window member are inclined relative to the camera bottom, and the wall parts are intermittently provided on at least a part of the inclined side.

Because the wall parts have been provided at the periphery of the display portion, it is possible to reduce the risk of damage to the window member by direct infliction of an external impact on the window member.

Since the wall parts intermittently surround the opening corresponding to the display portion and the window member, it is possible to prevent the collection of rain water, etc., inside the opening.

By having the cover and the window member inclined to one side of the camera relative to the camera bottom and by providing cutout parts in the wall part which is the lower than the other wall parts, rain water is easily discharged and dust is easily removed from the area of the display device.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

The present invention is described with reference to the drawings which were briefly described above and which are now referred to in order to provide a detailed description of the preferred embodiments. Like parts will be identified with like reference numerals.

Figure 1:
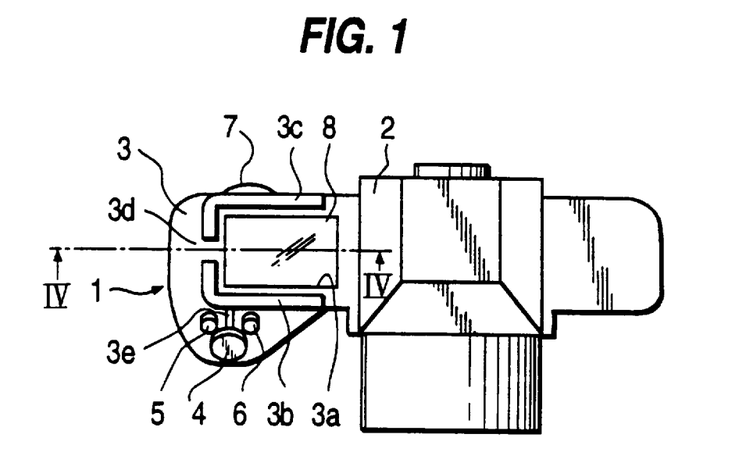
FIG. 1 is a top view which shows the configuration of a camera having a display device according to a first embodiment of the present invention.
Figure 2:
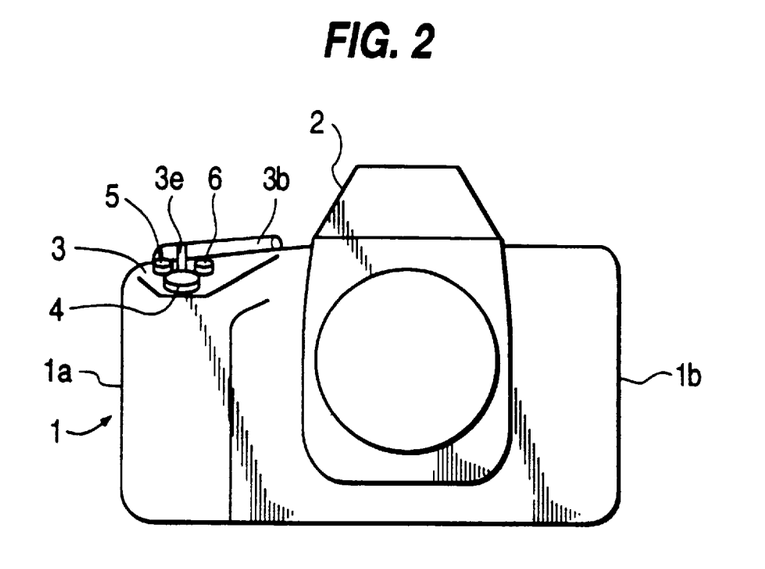
FIG. 2 is a frontal view of the camera of FIG. 1.
Figure 3:
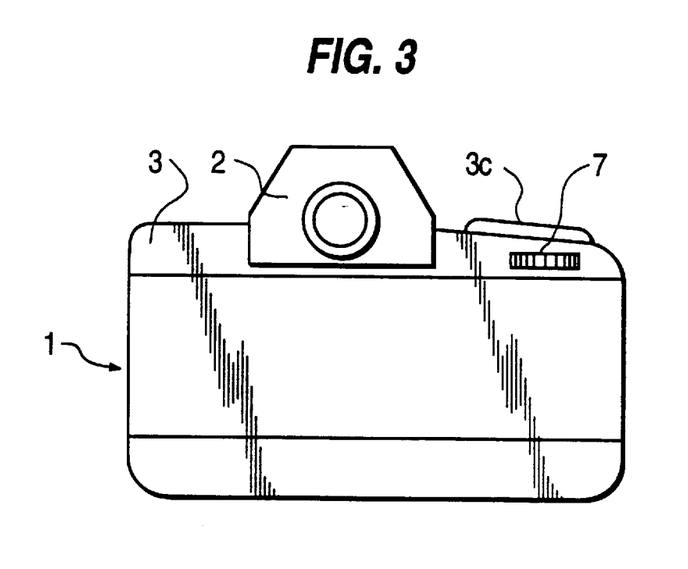
FIG. 3 is a rear view of the camera of FIG. 1.

FIGS. 1 through 4 show the configuration of a first embodiment of a camera having a display device according to the present invention. As shown in the drawings, a camera 1 includes a release button 4, a setting button 5, a setting button 6, and a setting dial 7 which are provided on one side of a camera cover 3 on the top face of the camera 1. The camera further includes a view finder 2. As shown in FIG. 3, a portion of the setting dial 7, located near the top of the camera, projects outward from the rear surface of the camera.

A transparent window member 8 is affixed to an opening 3*a* of the cover 3 (see FIG. 1). A display device 9 (mentioned below and shown in FIG. 4) which uses a liquid crystal display panel is arranged below the window member 8 and inside the camera, and its display of information can be observed through the window member 8.

The setting buttons 5 and 6 are operated simultaneously with the setting dial 7. For example, the setting button 5 is the button used for exposure correction setting, and when the setting dial 7 is turned while setting button 5 is pushed, the state of exposure correction can be changed. Since the functioning of the setting buttons 5 and 6 in conjunction with the setting dial 7 concern a known operational process and a known control process, further explanation is omitted.

At the periphery of the opening 3*a* of the cover 3, cover wall parts 3*b*, 3*c* are molded so that they rise up from the cover surface and are above the surface of the window member 8. A cutout part 3*d* is provided between the wall parts 3*b* and 3*c*. As shown in FIG. 2, the top surface of the cover 3, including the window member 8, is inclined to the left side of the drawing so that the top of camera end or side part 1*a* is lower than the top of camera end or side part 1*b*. Moreover, as shown in FIG. 1, a cover wall part 3*e* which projects toward the release button 4 through the space between the setting buttons 5 and 6 is formed so that it adjoins the cover wall part 3*b*. With regard to the side of the window member 8 near the view finder 2, since the view finder 2 also fulfills the function of a wall, no wall is specially formed here.

Figure 4:
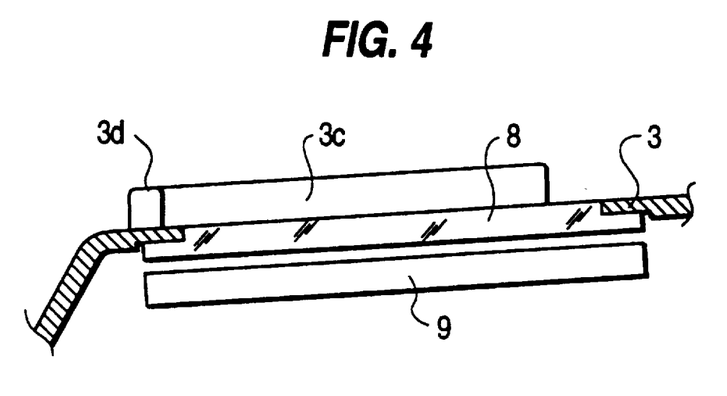
FIG. 4 is a cross-sectional view of the camera of FIG. 1, taken along line IV—IV in FIG. 1.

FIG. 4 shows an enlarged cross-sectional view of the camera of FIG. 1, taken along line IV—IV in FIG. 1. The display device 9 is arranged underneath the window member 8. As mentioned above, cover 3, window member 8, and display device 9 are inclined on a downward slope toward the left side in FIG. 2 of the drawings and away from the view finder 2. In FIG. 3, the downward slope, of course, is toward the right side thereof.

Figure 5:
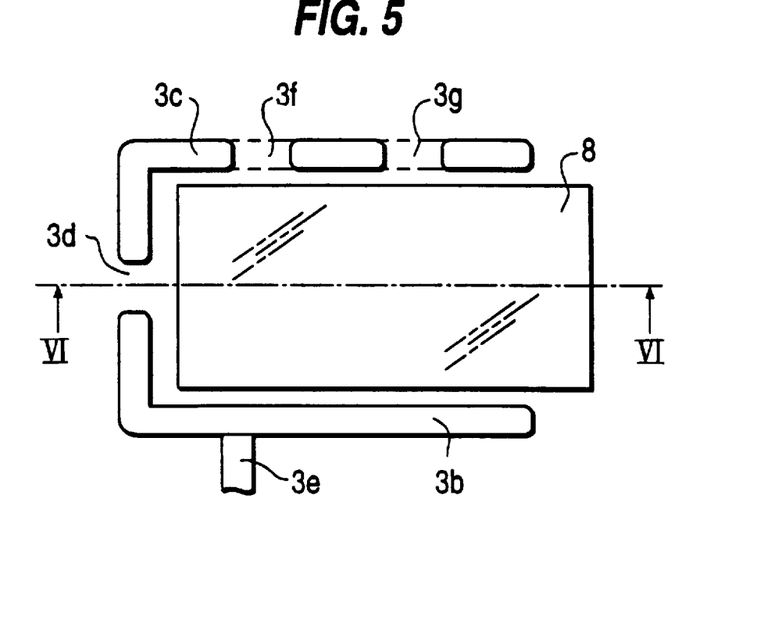
FIG. 5 is a frontal view which shows the configuration of the wall parts of a camera having a display device according to a second embodiment of the present invention.
Figure 6:
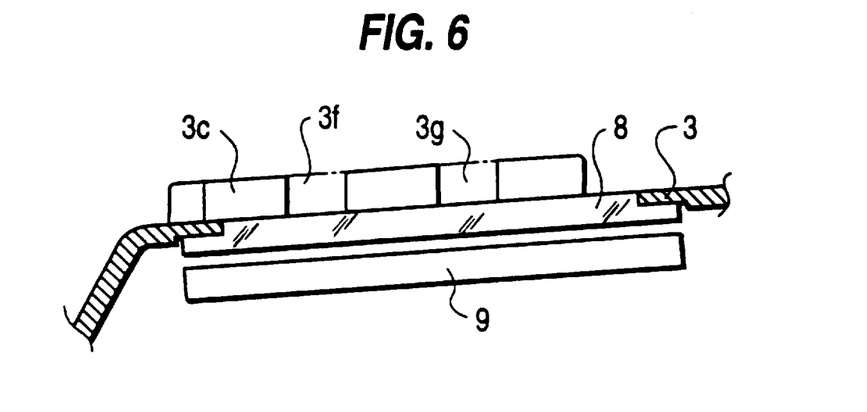
FIG. 6 is a cross-sectional view of the camera of FIG. 5, taken along line VI—VI in FIG. 5.

FIG. 5 and FIG. 6 show a second embodiment of a camera having a display device according to the present invention, with the wall parts corresponding to the wall parts of FIG. 1. The window member 8 and display device 9 are identical to those in the first embodiment, and have been given the same reference numerals. In this second embodiment, the part generally corresponding to cover wall part 3*c* shown in FIG. 4 has been divided into three parts by the cutout parts 3*f* and 3*g*.

Figure 7:
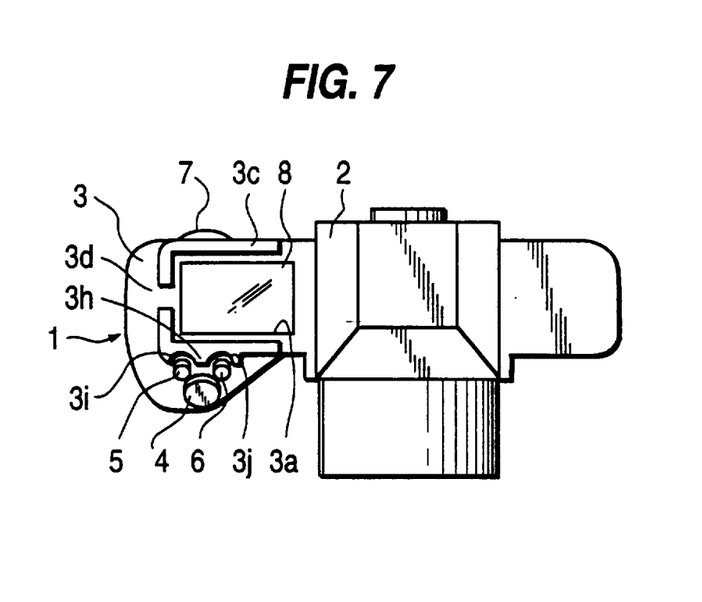
FIG. 7 is a top view which shows the configuration of a camera having a display device according to a third embodiment of the present invention.

FIG. 7 shows a third embodiment of a camera having a display device according to the present invention with the wall parts corresponding to those for the camera in FIG. 1. The window member 8 and display device 9 are identical to those in the first embodiment, and have been given the same reference numerals. In this third embodiment, cover wall part 3*e* shown in FIG. 4 has not been provided, but instead, concave wall parts 3*i* and 3*j* half surround the setting buttons 5 and 6 and have been provided in wall part 3*h* which generally corresponds to wall part 3*b* of the camera of FIG. 1.

According to each of the above embodiments, since the wall parts 3*b* (or 3*h*) and 3*c* have been provided at the periphery of the window member 8, even in the case of a collision with a foreign object, such as another camera, etc., the danger of a direct impact on the window member 8 and of damage to it is reduced. As shown in FIGS. 5 and 6, even if cutout parts 3*f* and 3*g* are provided, if the form is substantially identical to the form shown by the dotted line with regard to the point of blocking the impact, it is possible to provide the cutout parts 3*f* and 3*g* without reducing the protection for the window member. In particular, by providing the cutout parts 3*f* and 3*g* in wall part 3*c* which is near the camera rear side, it becomes easy to see the information when viewing the display from the rear side.

Moreover, as a result of providing the cutout parts 3*f* and 3*g*, because foreign materials, such as rain water, can be removed as soon as they collect, there is no impediment to viewing the display. In addition, since the cutout part 3d has been provided on the lower side of the inclined display portion (window member 8 on top surface of the camera), water drainage becomes easier.

As shown in FIG. 1, since the cover wall part 3*b* is arranged in proximity to the setting buttons 5 and 6, there is the effect that it becomes difficult to inadvertently push setting button 5 or 6. Because the cover wall part 3*e* extends through the space between the setting buttons 5 and 6, it is easy to distinguish between the two buttons in the case where a user manipulates setting button 5 or 6 by groping with the hand while peering through the view finder, and this prevents an improper setting being made. In FIG. 7, there is no wall part 3*e*, but since a part of wall part 3*h* half encircles the periphery of the setting buttons 5 and 6, there is the same effect that it is easy to distinguish between the two buttons, and thus prevent a wrong operation.

In the above embodiments, the wall parts 3*b* and 3*c* of FIGS. 1–6 (or wall parts 3*h* and 3*c* of FIG. 7) are integrally molded with the cover 3 and rise up from it. Of course, the embodiments can be modified to have a design where the wall parts of the cover are formed by a separate member.

As explained above, since the camera cover wall parts are provided in the vicinity of the periphery of the display window member, even in the case of a collision with another object, for example, another camera, there is no direct impact to the window member and, as a result, the risk of damage to the window member is reduced.

Moreover, since the camera cover wall parts intermittently surround the periphery of the camera display portion (i.e., the window member 8 and the like), the collection of rain water, dust, etc., due to the wall parts can be prevented.

Furthermore, because the camera display portion is inclined, part of the wall part of the inclined side (lower side) is cut out, allowing water and dust to be more easily removed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having a camera body with a top surface and a bottom surface, the camera comprising:

a display device, being within and towards one side of the camera body and facing the top surface, that displays information concerning picture taking by the camera;

a cover forming the camera body top surface and having a cover portion with an opening corresponding to the display device;

a window member, affixed in the cover opening and covering the display device, that allows the display information of the display device to be viewed;

a view finder unit, extending higher than a top surface of said window member, and arranged in a center portion of the camera body at a side of said window member; and wherein said cover has an outer wall, distinct and spaced apart from said view finder unit, said outer wall rising higher than a top surface of said window member in a direction perpendicular to the top surface of said window member and rising to a height lower than a top of said viewfinder unit in the perpendicular direction, said outer wall extending along a periphery of said window member.

2. The camera as claimed in claim 1, wherein said outer wall comprises a plurality of wall parts with cutout portions between selected ones of said plurality of wall parts.

3. The camera as claimed in claim 2, wherein said wall parts are integrally formed with said cover.

4. The camera as claimed in claim 2, wherein said cover portion with the opening and said window member are inclined downward relative to the bottom surface of the camera body toward one side of the camera body.

5. The camera as claimed in claim 4, wherein at least one of said cutout portions is formed at a side of said outer wall nearest said downwardly inclined one side of the camera body.

6. The camera as claimed in claim 4, wherein said outer wall has a side which extends along a periphery of said window member which is parallel to and nearest the rear of the camera, and at least one of said cutout portions is formed at the side of the outer wall parallel to and nearest the rear of the camera.

7. The camera as claimed in claim 1, wherein said outer wall comprises a plurality of wall parts with cutout portions between selected ones of said plurality of wall parts, said cutout portions being coplanar with said window member.

8. The camera as claimed in claim 1, wherein said outer wall has a side which extends along a periphery of said window member which is parallel to and nearest the rear of the camera.

9. The camera as claimed in claim 1, further comprising:

a plurality of setting buttons to change settings of the camera; and a setting wall part rising higher than the top surface of said window member in the direction perpendicular to the top surface of said window member and extending between ones of said plurality of setting buttons.

10. The camera as claimed in claim 9, wherein said setting wall part has concave portions which respectively partially encircle said plurality of setting buttons.

11. A camera having a camera body with a top surface and a bottom surface, the camera comprising:

a display device, facing the top surface, that displays information concerning picture taking by the camera;

a cover forming the camera body top surface and having a cover portion with an opening corresponding to the display device;

a window member affixed in the cover opening and covering the display device, that allows the display information of the display device to be viewed;

a view finder unit, extending higher than a top surface of said window member, and arranged in a center portion of the camera body at a side of said window member; and wherein said cover has an outer wall distinct from an upper section of said view finder unit, said outer wall rising higher than a top surface of said window member in a direction perpendicular to the top surface of said window member and rising to a height lower than a top of the upper section of said viewfinder unit in the perpendicular direction, said outer wall surrounding a portion of a periphery of said window member.

12. The camera as claimed in claim 11, wherein said outer wall comprises a plurality of wall parts with cutout portions between selected ones of said plurality of wall parts, said cutout portions having bottoms no higher than the top surface of said window member.

13. The camera as claimed in claim 11, wherein said cover portion with the opening and said window member are inclined downward relative to the bottom surface of the camera body toward one side of the camera body.

14. The camera as claimed in claim 11, wherein said outer wall has a side which extends along a periphery of said window member which is parallel to and nearest the rear of the camera.

15. The camera as claimed in claim 11, further comprising:

a plurality of setting buttons to change settings of the camera; and a setting wall part rising higher than the top surface of said window member in the direction perpendicular to the top surface of said window member and extending between ones of said plurality of setting buttons.

16. A camera having a camera body with a top surface and a bottom surface, the camera comprising:

a display device, being within and towards one side of the camera body and facing the top surface, that displays information concerning picture taking by the camera;

a cover forming the camera body top surface and having a cover portion with an opening corresponding to the display device; and a window member, affixed in the cover opening and covering the display device, that allows the display information of the display device to be viewed;

wherein said cover has an outer wall distinct from an upper section of said viewfinder unit. Said outer wall rising higher than a top surface of said window member, in a direction perpendicular to the top surface of said window member and rising to a height lower than a top of the upper section of said viewfinder unit in the perpendicular direction, said outer wall extending along a periphery and along at least two sides of said window member.

17. The camera as claimed in claim 16, wherein said outer wall comprises a plurality of wall parts with cutout portions between selected ones of said plurality of wall parts.

18. The camera as claimed in claim 17, wherein said wall parts are integrally formed with said cover.

19. The camera as claimed in claim 17, wherein said cover portion with the opening and said window member are inclined downward relative to the bottom surface of the camera body toward one side of the camera body.

20. The camera as claimed in claim 19, wherein at least one of said cutout portions is formed at a side of said outer wall nearest said downwardly inclined one side of the camera body.

21. The camera as claimed in claim 16, wherein said outer wall comprises a plurality of wall parts with cutout portions between selected ones of said plurality of wall parts, said cutout portions being coplanar with said window member.

22. The camera as claimed in claim 16, wherein said outer wall has a side which extends along a periphery of said window member which is parallel to and nearest the rear of the camera.

23. The camera as claimed in claim 16, further comprising:

a plurality of setting buttons to change settings of the camera; and a setting wall part rising higher than the top surface of said window member in the direction perpendicular to the top surface of said window member and extending between ones of said plurality of setting buttons.

* * * * *

UNITED STATES PATENT AND TRADEMARK OFFICE
CERTIFICATE OF CORRECTION

PATENT NO. : 5,848,313
DATED : December 8, 1998
INVENTOR(S) : Nobuo Matsukawa

It is certified that error appears in the above-identified patent and that said Letters Patent is hereby corrected as shown below:

On the title page,:

Item [30] after "5-017286" delete "U";

Column 6, line 47, (claim 47), change "unit. Said" to --unit, said--.

Signed and Sealed this

Sixth Day of July, 1999

Attest:

Q. TODD DICKINSON

Attesting Officer

Acting Commissioner of Patents and Trademarks